(12) United States Patent
Akimoto

(10) Patent No.: US 6,810,150 B1
(45) Date of Patent: Oct. 26, 2004

(54) IMAGE COMMUNICATION METHOD AND APPARATUS

(75) Inventor: Naoto Akimoto, Ibaraki-ken (JP)

(73) Assignee: Canon Kabushiki Kaisha, Tokyo (JP)

(*) Notice: Subject to any disclaimer, the term of this patent is extended or adjusted under 35 U.S.C. 154(b) by 609 days.

(21) Appl. No.: 09/605,374

(22) Filed: Jun. 29, 2000

(30) Foreign Application Priority Data

Jun. 30, 1999 (JP) ............................................ 11-186735
Jun. 26, 2000 (JP) ...................................... 2000-191656

(51) Int. Cl.⁷ ................................................. G06K 9/36
(52) U.S. Cl. ................................................... 382/232
(58) Field of Search ...................... 358/1.1, 1.2, 403, 358/405, 432, 433, 447, 448, 449, 450, 451; 382/232, 233, 244, 298, 299, 317

(56) References Cited

U.S. PATENT DOCUMENTS 5,528,740 A * 6/1996 Hill et al. .................... 395/128
5,566,003 A * 10/1996 Hara et al. ................... 358/448
6,088,489 A * 7/2000 Miyake ....................... 382/299
6,188,766 B1 * 2/2001 Kocher ........................ 380/246
6,246,797 B1 * 6/2001 Castor et al. ................ 382/232

* cited by examiner

Primary Examiner—Jose L. Couso
(74) Attorney, Agent, or Firm—Fitzpatrick, Cella, Harper & Scinto

(57) ABSTRACT

In general, when an image communication apparatus receives a JPEG file and the main scanning size declared in the file differs from the main scanning size declared in a communication protocol, the JPEG file cannot be decoded. According to this invention, when the main scanning size declared in a received JPEG file differs from the main scanning size declared in the communication protocol, the main scanning size of the JPEG file is validated to allow the JPEG file to be appropriately decompressed and printed.

48 Claims, 9 Drawing Sheets

FIG. 7

JPEG FILE SENT FROM YOU WAS NOT
PROPERLY PRINTED BECAUSE OF
INCORRECT MAIN SCANNING WIDTH.
PLEASE SEND THE FILE AGAIN UPON
MAKING A CHECK ON IT.

IMAGE COMMUNICATION METHOD AND APPARATUS

FIELD OF THE INVENTION

The present invention relates to an image communication method and apparatus and, more particularly, to an image communication method and apparatus for receiving and processing a compressed image file such as a JPEG file.

BACKGROUND OF THE INVENTION

Conventional facsimile apparatuses have been mainly designed for monochromatic image communication. However, as printers and scanners have become capable of color processing with advances in image processing techniques, color documents have become widespread, and the need for color image communication has grown in the field of facsimile apparatuses.

Under the circumstances, facsimile apparatuses capable of communicating color images by unique procedures came on the market, and color communication procedures were standardized by the ITU-T recommendations. It can therefore be expected that the color facsimile apparatus market will further expand.

A characteristic feature of a color communication procedure according to the ITU-T recommendations is that a color communication function is added to the protocol of the conventional monochromatic facsimile communication procedure to transmit color image data upon JPEG compression.

According to this color communication procedure, the main scanning sizes allowed for transmission correspond to standard-size sheets, i.e., A4, B4, and A3 sheets. That is, according to this specification, only originals having predetermined main scanning sizes can be transmitted. If, for example, the size of transmission image is smaller than the predetermined size, a JPEG file must be created after the main scanning size is justified to a standard length by, for example, adding white pixels.

A main scanning size can be defined in the header of a JPEG file. A color facsimile apparatus complying with the above ITU-T recommendations may receive a JPEG file having a main scanning size different from the main scanning size declared in the communication protocol. In this case, since the main scanning length of the JPEG file is recognized as a standard length, the file cannot be normally decoded, resulting in a printout failure.

In this case, the color facsimile apparatus generally has a memory reception function, and printing often starts after the JPEG file is received. In the receiving apparatus, therefore, an error occurs in printing operation even though communication is normally terminated.

The transmitting apparatus recognizes that transmission is normally terminated, in spite of the fact that the transmitted facsimile file cannot be printed on the receiving side.

SUMMARY OF THE INVENTION

The present invention has been proposed to solve the conventional problems, and has as its object to provide an image communication method and apparatus which can process an image of a received compressed image file such as a JPEG file in an appropriate main scanning length.

According to the present invention, the foregoing object is attained by providing an image communication apparatus for communicating image data with another apparatus on the basis of a communication protocol including declaration of a main scanning size, comprising: reception means for receiving a compressed image file including information indicating that a main scanning size is a first size; main scanning size control means for setting the first size as a main scanning size when a second size declared as a main scanning size in the communication protocol differs from the first size; and image processing means for processing the compressed image file on the basis of the set main scanning size.

It is another object of the present invention to provide an image communication method and apparatus which can print out an image of a received compressed image file such as a JPEG file on a printing medium without any omission.

According to the present invention, the foregoing object is attained by further providing an image communication apparatus for communicating image data with another apparatus on the basis of a communication protocol including declaration of a main scanning size, comprising: reception means for receiving a compressed image file including information indicating that a main scanning size is a first size; main scanning size control means for setting the first size as a main scanning size when a second size declared as a main scanning size in the communication protocol differs from the first size; selection means for selecting a printing medium on which printing can be performed in the set main scanning size; decompression means for decompressing the compressed image file on the basis of the set main scanning size; and output means for outputting the decompressed image data on the selected printing medium.

It is another object of the present invention to provide an image communication method and apparatus which interrupts communication and takes appropriate measures when an image of a received compressed image file such as a JPEG file cannot be appropriately printed out.

According to the present invention, the foregoing object is attained by further providing an image communication apparatus for communicating image data with another apparatus on the basis of a communication protocol including declaration of a main scanning size, comprising: reception means for receiving a compressed image file including information indicating that a main scanning size is a first size; and communication control means for interrupting communication with said another apparatus when a second size declared as a main scanning size in the communication protocol differs from the first size.

In accordance with the present invention as described above, the invention is particularly advantageous that an image of a received compressed image file such as a JPEG file can be processed in an appropriate main scanning length.

In addition, an image of a received compressed image file such as a JPEG file can be printed out on a printing medium without any omission.

Furthermore, when an image of a received compressed image file such as a JPEG file cannot be appropriately printed out, communication is interrupted, and appropriate measures can be taken.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 7 is a view showing an example of an image for notifying a reason for communication interruption in the third embodiment;

DETAILED DESCRIPTION OF THE PREFERRED EMBODIMENTS

Preferred embodiments of the present invention will be described in detail in accordance with the accompanying drawings.

<First Embodiment>

Figure 1:
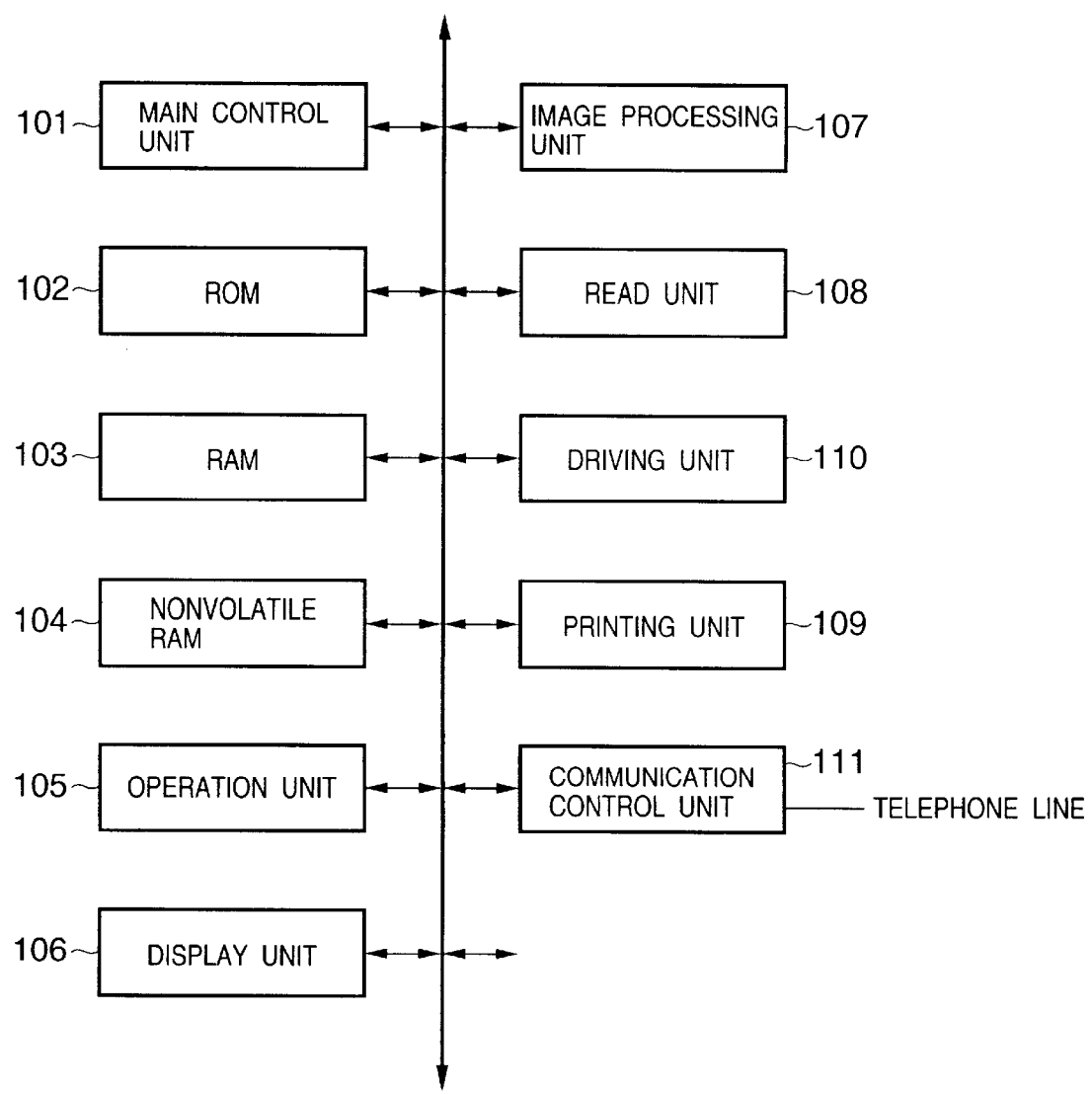
FIG. 1 is a block diagram showing the arrangement of a facsimile apparatus according to an embodiment of the present invention.

FIG. 1 is a block diagram showing the arrangement of a color facsimile apparatus to which the first embodiment is applied.

Referring to FIG. 1, a main control unit 101 systematically controls the overall apparatus, i.e., a RAM 103, nonvolatile RAM 104, operation unit 105, display unit 106, image processing unit 107, read unit 108, printing unit 109, driving unit 110, and communication control unit 111, in accordance with programs stored in a ROM 102.

The RAM 103 stores monochromatic binary image data and color multilevel image data read by the read unit 108, JPEG data obtained by JPEG-compressing the read data in the image processing unit 107, and color binary data printed by the printing unit 109. The RAM 103 also stores monochromatic binary data and JPEG data output to a telephone line through the communication control unit 111, color multilevel data obtained by decompressing these data, color binary data that is binarized for printing, and the like. The RAM 103 is also used as a work area in read, printing, or communication operation.

The nonvolatile RAM 104 is formed by a battery-backed-up SRAM, in which data such as a telephone number unique to the apparatus and an abbreviated user name, and information that should not be lost, e.g., a communication result and transmission start speed, are stored. A characteristic feature of this embodiment is that an area for the item"printing position in case of color reception image size inconsistency" is prepared in the nonvolatile RAM 104.

The operation unit 105 is comprised of a start key for transmission/reception processing, a mode key for designating a communication mode for a transmission image, e.g., a color mode and monochromatic mode, a copy key for performing copying processing, a stop key for stopping operation, a registration key for performing one-touch registration, a registration key for registering information associated with a network, e.g., a transmission start speed, and communication partner information, a setting key for setting a call time, and the like.

The display unit 106 is made up of a dot-matrix type LCD and LCD driver, and displays various information under the control of the main control unit 101.

The image processing unit 107 performs various types of image processing such as compression of monochromatic binary data read by the read unit 108, JPEG compression of color multilevel data, compression/decompression of monochromatic binary data for transmission/reception of image to to/from a communication partner through the communication control unit 111, and decompression of monochromatic binary data or color JPEG image in printing an image by using the printing unit 109, and stores the resultant image data in the RAM 103.

The read unit 108 is comprised of a DMA controller, CCD or contact image sensor (CS), general-purpose IC, and the like. The read unit 108 sends data read by using the CCD or CS to the RAM 103 or image processing unit 107 under the control of the main control unit 101.

The printing unit 109 is comprised of a DMA controller, B4/A4-size thermal head or ink-jet head, general-purpose IC, and the like. The printing unit 109 reads out print data from the RAM 103 and prints out the data on printing paper under the control of the main control unit 101. Note that printing sheets of a plurality of sizes can be set in the printing unit 109.

The driving unit 110 is comprised of a stepping motor for driving feed and discharge rollers at the read unit 108 and printing unit 109, gears for transmitting the driving force of the motor, a driver circuit for controlling the motor, and the like.

The communication control unit 111 is comprised of modems complying with the specifications defined by V34, V32, V32bis, V17, V29, V.27ter, V23, and V.21 (H,L), a clock generating circuit and NCU connected to the modems, and the like. The communication control unit 111 modulates transmission image data stored in the RAM 103 and outputs the modulated data onto the telephone line under the control of the main control unit 101. The communication control unit 111 also implements facsimile communication complying with the ITU-T T.30 recommendation, demodulates an image received through the telephone line, and stores the demodulated data in the RAM 103.

Figure 2:
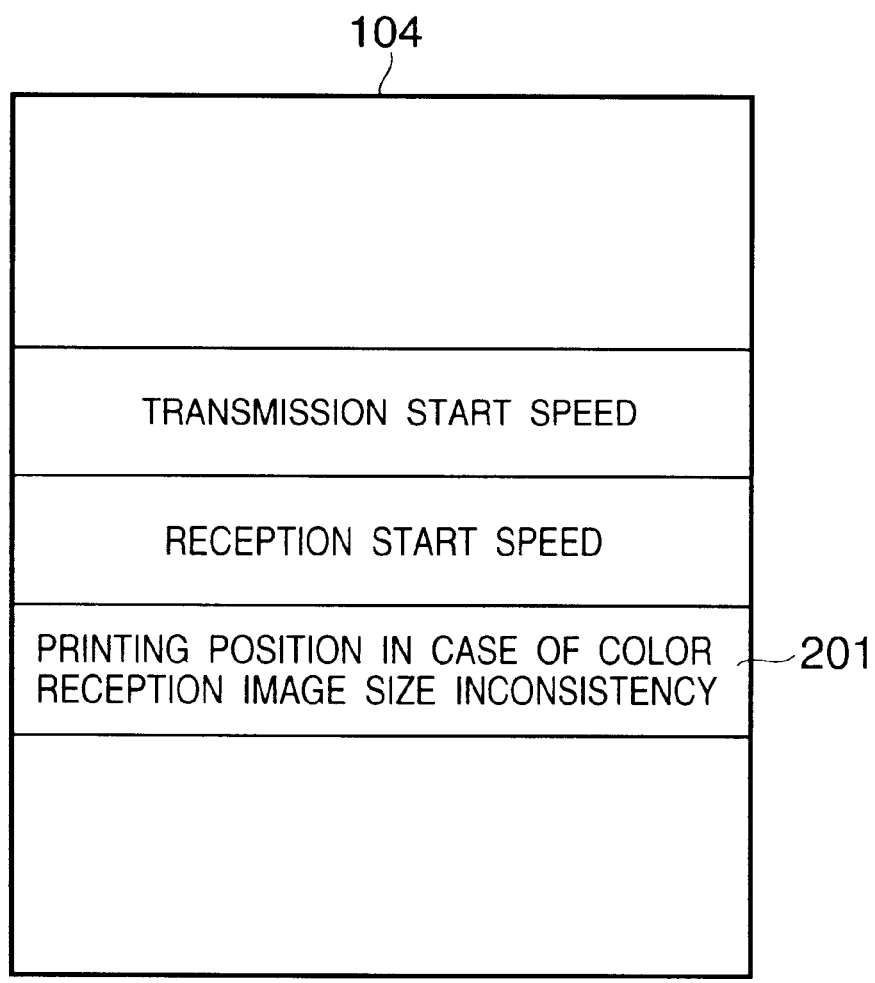
FIG. 2 is a view showing an example of the memory configuration of a nonvolatile RAM in this embodiment.

FIG. 2 is a view showing the memory configuration of the nonvolatile RAM 104. The nonvolatile RAM 104 stores information to be kept stored even after the apparatus is powered off. As shown in FIG. 2, in this embodiment, an area 201 "printing position in case of color reception image size inconsistency" (to be simply referred to as "printing position in case of inconsistency" hereinafter) is prepared in the nonvolatile RAM 104 in addition to the area "transmission start speed" and the area "reception start speed". The user can set "printing position in case of inconsistency" to "left-align" or "centering" by operating the operation unit 105. In the "left-align" setting, if a JPEG file received as a color file has a main scanning different from that declared by the protocol defined by ITU-T T.30, the received image is printed while it is aligned to the left of a printing sheet. In the "centering" setting, if a received file also differs in main scanning size from the protocol, the received image is printed while it is centered in the main scanning direction of a printing sheet.

Figure 3:
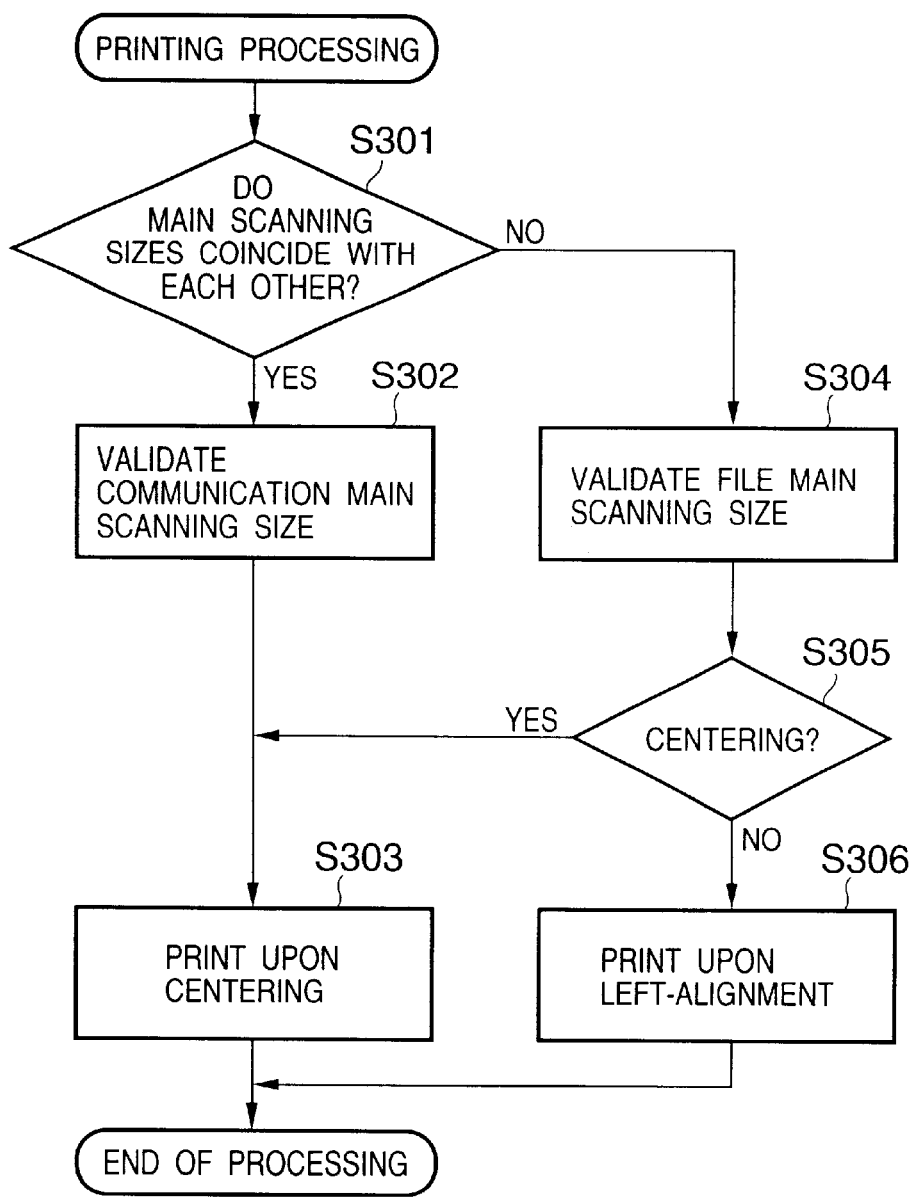
FIG. 3 is a flow chart showing printing processing in color reception in this embodiment.

FIG. 3 is a flow chart showing printing processing to be performed when a color image (JPEG file) is received in this embodiment. A program for implementing the processing shown in this flow chart is stored in the ROM 102. The main control unit 101 loads this program into the RAM 103 to implement the processing shown in the flow chart of FIG. 3.

In step S301, the main control unit 101 checks whether the main scanning size (to be referred to as the communication main scanning size hereinafter) declared by the communication protocol coincides with the main scanning size (to be referred to as the file main scanning size hereinafter) declared by a JPEG file.

In this case, the communication main scanning size is based on the printing width (the number of pixels per main scanning length) designated in DCS (Digital Command Signal) defined in ITU-T T.30, and the file main scanning size is based on the number of pixels per line which is designated in the frame header of the JPEG file.

If these main scanning sizes coincide with each other, the communication main scanning size is validated in step S302.

In step S303, the JPEG file is printed while it is centered. More specifically, the image processing unit 107 generates C, M, Y, and K binary data by decompressing the JPEG file and performing appropriate image processing. After a print start position is then set in the printing unit 109 to center the color image in the main scanning direction of a printing sheet, the printing unit 109 executes printing.

If it is determined in step S301 that the main scanning sizes do not coincide with each other, the flow advances to step S304 to validate the file main scanning size. With this operation, the received JPEG file is properly decompressed and printed.

In step S305, it is checked whether "printing position in case of inconsistency" in the nonvolatile RAM 104 is set to "centering". If YES in step S305, the flow advances to step S303 to decompress the JPEG file into C, M, Y, and K binary data and then print the data while it is centered in the main scanning direction of the printing sheet, i.e., in the centering mode.

If it is determined in step S305 that "printing position in case of inconsistency" is not set to "centering", the flow advances to step S306 to print an image of the JPEG file while it is aligned to the left. More specifically, the image processing unit 107 generates C, M, Y, and K binary data by decompressing the JPEG file and performing appropriate image processing. After a print start position is set in the printing unit 109 such that the color image is aligned to the left end of the printing sheet, printing is executed.

As described above, according to this embodiment, even if the main scanning size declared in a received JPEG file differs from the main scanning size declared in the communication protocol, an image of the received JPEG file can be accurately decompressed and printed by validating the main scanning size of the JPEG file.

In addition, allowing the user to set the printing position of a JPEG image on a printing sheet further improves operability.

The compression scheme used in this embodiment is not limited to the JPEG scheme. An image file can be compressed by another scheme as long as information about the number of pixels in the main scanning direction can be added.

It is possible to print a JPEG file while it is aligned to the right when "printing position in case of inconsistency" is not set to "centering".

<Second Embodiment>

The second embodiment of the present invention will be described below. Since the arrangement of a color facsimile apparatus of the second embodiment is the same as that of the first embodiment shown in FIG. 1, a description thereof will be omitted. The memory configuration of a nonvolatile RAM 104 is also the same as that shown in FIG. 2, in which an area 201 "printing position in case of inconsistency" is prepared. The user can set either "left-align" or "centering" by operating an operation unit 105.

A characteristic feature of the second embodiment is that the function of selecting a printing sheet suitable for appropriate printing in accordance with the main scanning size of a JPEG file is added to the first embodiment described above.

Figure 4:
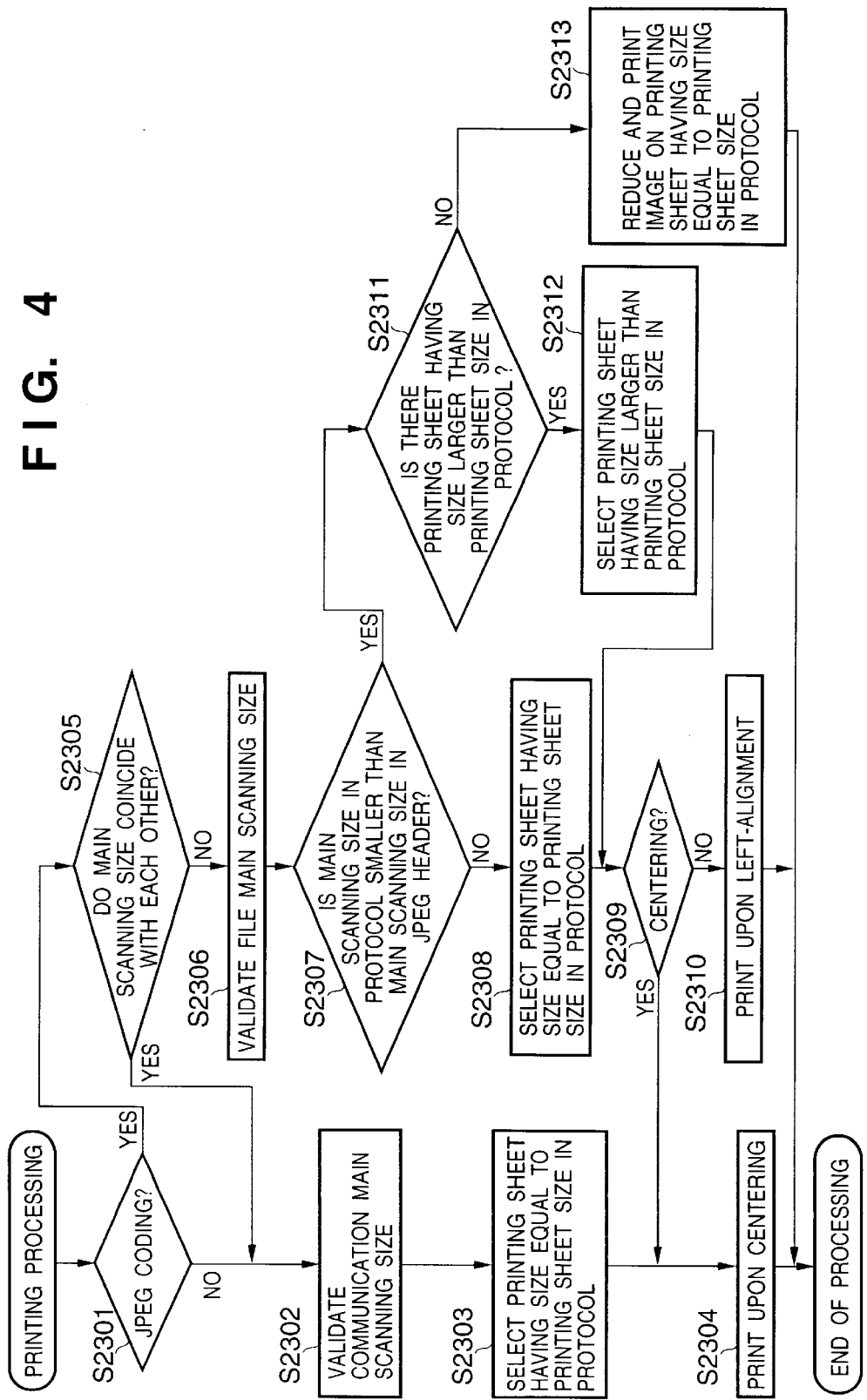
FIG. 4 is a flow chart showing printing processing in color reception in the second embodiment.

FIG. 4 is a flow chart showing printing processing for one page upon reception of a color image in the second embodiment. A program for implementing the processing shown in the flow chart is stored in a ROM 102. A main control unit 101 loads this program into a RAM 103 to implement the processing shown in the flow chart of FIG. 4.

In step S2301, it is checked by, for example, referring to header information whether the document to be printed, i.e., the received file, is JPEG-coded. If NO in step S2301, it is determined that the file is MR-coded, and the flow advances to step S2302 to validate the communication main scanning size declared in DCS.

In step S2303, the main control unit 101 selects one of printing sheets of a plurality of sizes set in a printing unit 109 which coincides with the printing sheet size declared in the communication protocol. In this case, the printing sheet size declared in the communication protocol is based on the maximum printing length designated in DCS.

In step S2304, the received file is decompressed and subjected to image processing in an image processing unit 107 to generate C, M, Y, and K binary data, and a print start position is set to center the color image in the main scanning direction of the selected printing sheet, thereby printing the image.

If it is determined in step S2301 that the received file is JPEG-coded, the main control unit 101 checks in step S2305, as in the first embodiment, whether the communication main scanning size coincides with the file main scanning size. If they coincide with each other, the flow advances to step S2302 to validate the communication main scanning size as described above. Thereafter, the image is printed while it is centered on the printing sheet in steps S2302 and S2304.

If it is determined in step S2305 that the main scanning sizes do not coincide with each other, the flow advances to step S2306 to validate the file main scanning size. With this operation, the received facsimile file can be accurately decompressed and printed.

In step S2307, the communication main scanning size is compared with the file main scanning size. If the communication main scanning size is larger, the flow advances to step S2308 to select one of printing sheets of a plurality of sizes set in the printing unit 109 which coincides with the printing sheet size declared in DSC in the communication protocol, as in step S2303 described above.

In step S2309, it is checked whether "printing position in case of inconsistency" in the nonvolatile RAM 104 is set to "centering". If YES in step S2039, the flow advances to step S2304, in which the image processing unit 107 decompresses the JPEG file into C, M, Y, and K binary data, and a print start position is set to center the image in the main scanning direction of the printing sheet, thereby printing the image.

If it is determined in step S2309 that "printing position in case of inconsistency" is not set to "centering", the flow advances to step S2310, in which the image processing unit 107 generates C, M, Y, and K binary data by decompressing the JPEG file and performing image processing, and a print start position is set to align the color image to the left end of the printing sheet, thereby printing the image.

If it is determined in step S2307 that the communication main scanning size is smaller than the file main scanning size, the flow advances to step S2311 to check whether there is a printing sheet, among sheets of a plurality of sizes set in the printing unit 109, which has a main scanning size larger than the printing sheet size declared in the communication protocol, i.e., a printing sheet on which the received JPEG file can be printed in equal size.

If YES in step S2311, this printing sheet, i.e., the printing sheet having a main scanning length larger than the printing sheet size designated in DCS, is selected in step S2312 as a printing sheet on which an image is to be actually printed. In the processing in step S2309 and subsequent steps, the JPEG file is printed in equal size in accordance with the "printing position in case of inconsistency" setting in the nonvolatile RAM 104 as described above.

If it is determined in step S2311 that there is no suitable printing sheet, the flow advances to step S2313. In step S2313, a printing sheet having a size coinciding with the printing sheet size designated in DCS is selected. The image processing unit 107 generates C, M, Y, and K binary data by decompressing the JPEG file and performing image processing including reduction in the main scanning direction. Thereafter, an image is printed on the selected printing sheet without any omission of a color image.

An example of the image reduction method in step S2313 will be described below. Consider simple thinning processing first. For example, after a received JPEG file is decompressed, pixels are deleted at a predetermined ratio to suppress any omission of the image, i.e., to set the number of pixels so as to allow an image to be printed within the main scanning size of the printing sheet. If binarization is performed afterward, the image can be reduced without causing any deterioration in image quality.

The other method can be applied as the image reduction method e.g. interpolating pixels.

In general, if the resolution of a file differs from the printing resolution of the printing unit 109, for example, the resolution of a received image is 200 dpi while the printing unit 109 corresponds to only a resolution of 360 dpi, the image processing unit 107 magnifies the received image by 1.8 (360/200) times and transfers the resultant data to the printing unit 109, thereby printing the received image in equal size. If, therefore, this magnification is given by (printing resolution/received image resolution)×(main scanning size in protocol/main scanning size of JPEG file)

the image can be printed in reduced size without thinning out pixels.

As described above, according to the second embodiment, as in the first embodiment, when the main scanning size declared in the communication protocol differs from the main scanning size declared in a JPEG file, the main scanning size of the JPEG file is validated. Assume the main scanning size declared in a JPEG file is larger. In this case, if there is a printing sheet having a main scanning size larger than the printing sheet size in the communication protocol, the image is printed on the printing sheet in equal size. If there is no such printing sheet, the image is printed on a printing sheet upon reduction to the same main scanning length as the printing sheet size in the communication protocol. This makes it possible to provide the user with a print without any image omission.

It is possible to print a JPEG file while it is aligned to the right as same as the first embodiment.

<Third Embodiment>

The third embodiment of the present invention will be described below. Since the arrangement of a color facsimile apparatus of the third embodiment is the same as that of the first embodiment shown in FIG. 1, a description thereof will be omitted. In the third embodiment, there is no need to prepare the item "printing position in case of inconsistency" in a nonvolatile RAM 104.

A characteristic feature of the third embodiment is that when the communication main scanning size and the file main scanning size do not coincide with each other, communication is interrupted, and the distant apparatus is notified of the corresponding information.

Figure 5:
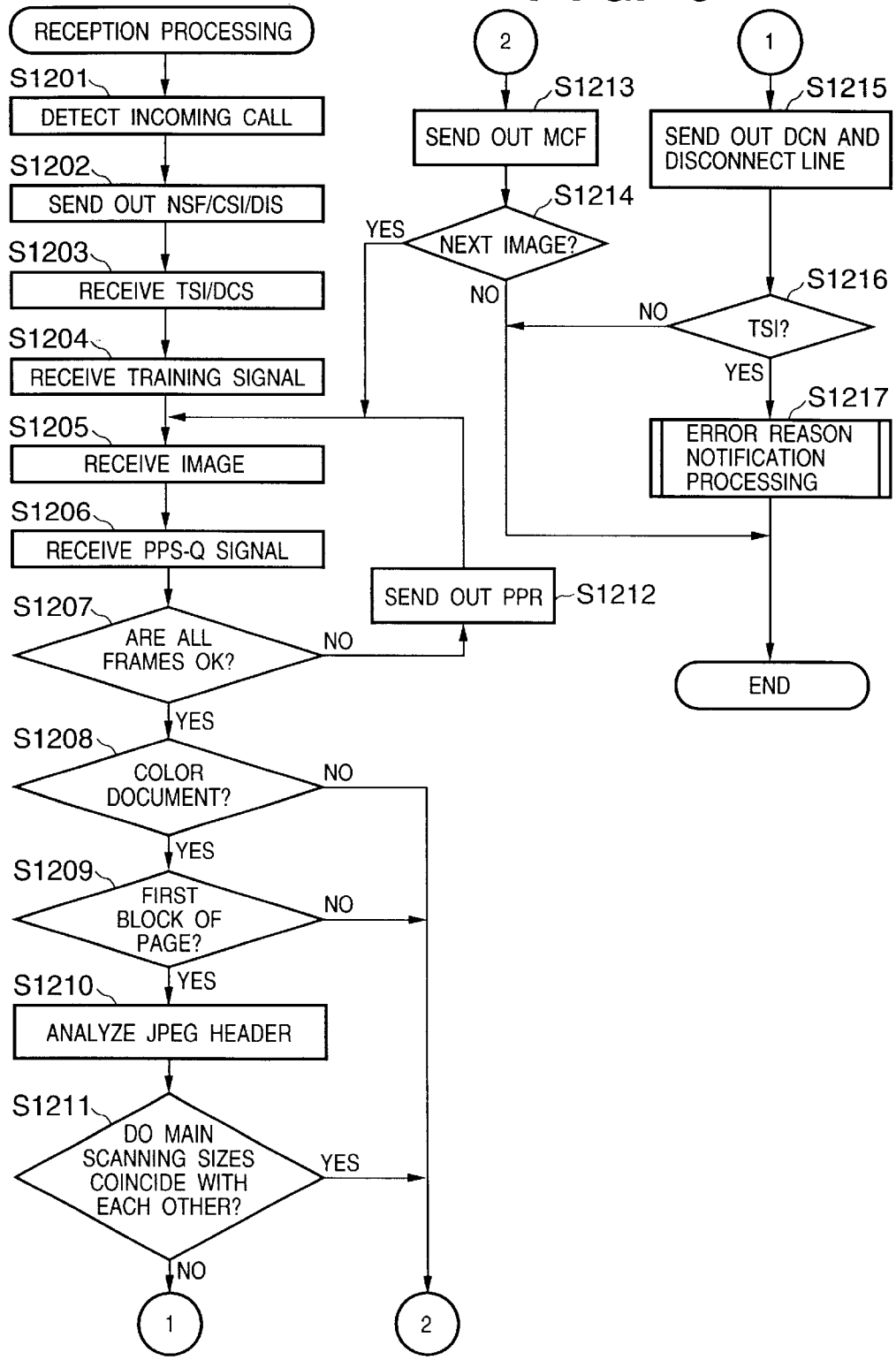
FIG. 5 is a flow chart showing reception processing in the third embodiment.

FIG. 5 is a flow chart showing color image reception processing in the third embodiment. A program for implementing the processing shown in this flow chart is stored in a ROM 102. A main control unit 101 loads this program into a RAM 103 and executes it to implement the processing shown in the flow chart of FIG. 5.

In step S1201, a communication control unit 111 monitors a GI (Group Identification) signal to detect the reception of the signal. Upon detection of the reception of the signal, the communication control unit 111 performs line connection. Upon detection of a CNG (calling tone) signal from the distant apparatus, the communication control unit 111 sends an NSF (Non Standard Facilities) signal, CSI (Called Station Identification) signal, or DIS (Digital Identification Signal) to the distant apparatus in step S1202. In step S1203, the communication control unit 111 receives a TSI (Transmitting Subscriber Identification) signal or DCS (Digital Command Signal) from the distant apparatus. Note that the TSI signal may not be sent from the distant apparatus. Upon reception of the TSI signal, the communication control unit 111 stores it in the RAM 103. In step S1204, the communication control unit 111 receives a training signal. If this signal is properly received, the communication control unit 111 returns a CFR (Confirmation to Receive) signal. In step S1205, the communication control unit 111 receives an image signal.

When the reception of an image of a block is completed upon reception of an EOM (End Of Message) signal, the communication control unit 111 receives a PPS-Q signal (PPS (Partial Page Signal)-EOM, PPS-MPS, PPS-EOP, or PPS-NULL). In step S1207, the communication control unit 111 checks whether all the frames of the image of the received block are normally received. If NO in step S1207, the communication control unit 111 returns a PPR (Partial Page Request) signal in step S1212. The flow then returns to step S1205 to receive a frame in which an error has occurred again.

If it is determined in step S1207 that all the frames have been normally received, the communication control unit 111 checks in step S1208, on the basis of the contents instructed by the DCS signal, whether the received document is a color document (JPEG file). If the received document is a color document, the flow advances to step S1209 to check whether the image received in step S1205 is the first block of a page. If the received image is the first block, the flow advances to step S1210 to analyze the JPEG header portion of the received image and store the main scanning size setting in the RAM 103.

In step S1211, the communication control unit 111 checks whether the main scanning size defined in the JPEG header of the received image coincides with the main scanning size calculated from the resolution and main scanning width declared in DCS. If NO in step S1211, the flow advances to step S1215 to send a DCN (disconnection command) signal to the distant apparatus to perform error termination of communication.

In step S1216, the communication control unit 111 checks whether the TSI signal is received together with the DSC signal. If YES in step S1216, the communication control unit 111 performs error reason notification processing with respect to the distant apparatus in step S1217, thus terminating the reception processing. If the TSI signal is not received, the reception processing is immediately terminated.

Assume that it is determined in step S1208 that the received document is not a color document, it is determined in step S1209 that the received image is not the first block of a page, or it is determined in step S1211 that the file main scanning size of the received image coincides with the communication main scanning size. In this case, the flow advances to step S1213 to send an MCF (message confirmation) signal to the distant apparatus to notify it of the proper reception of the image block. In step S1214, the communication control unit 111 checks on the basis of the type of PPS-Q signal received in step S1206 whether an image block is consecutively transmitted. If YES in step S1206, the communication control unit 111 receives the next image block in step S1205. If NO in step S1206, the reception processing is terminated.

Figure 6:
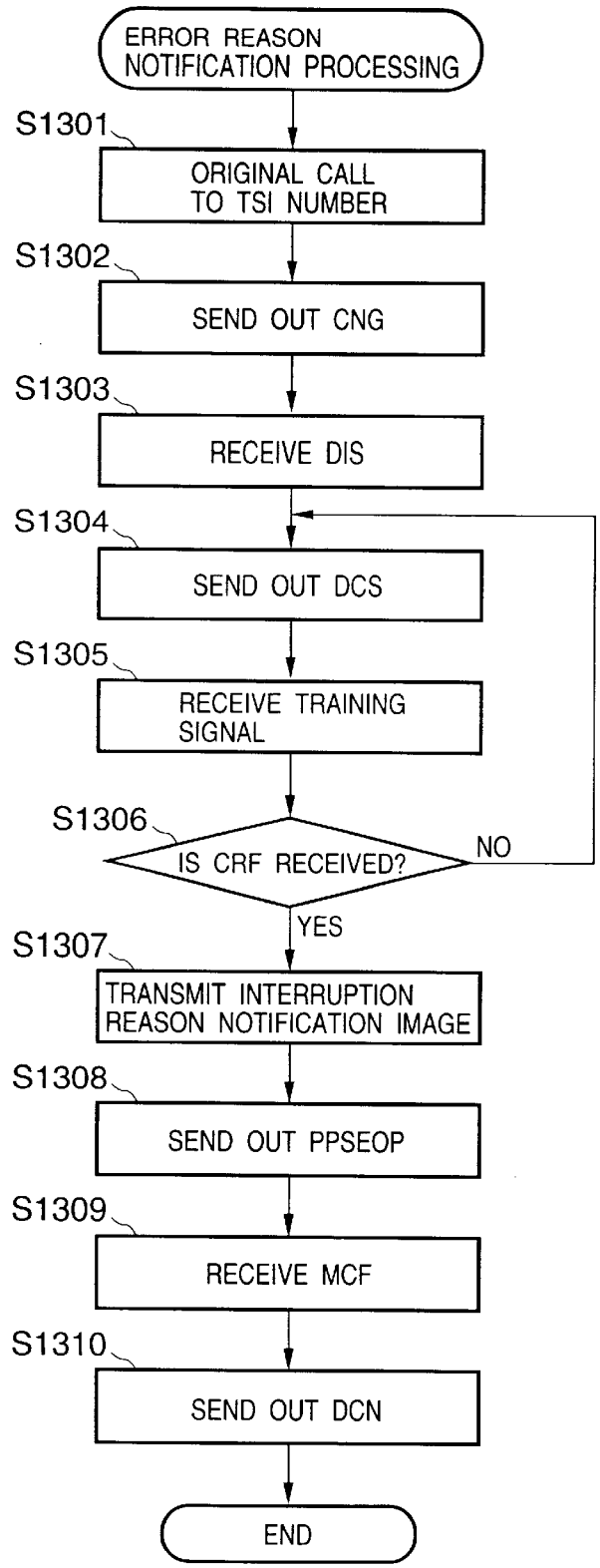
FIG. 6 is a flow chart showing error reason notification processing in the third embodiment.

FIG. 6 is a flow chart showing the error reason notification processing in step S1217 described above.

In step S1301, the communication control unit 111 originates a call to the number indicated by the TSI signal stored in the RAM 103. When the line is connected, the communication control unit 111 sends out the CNG signal in step S1302. Upon reception of the DIS signal from the distant apparatus in step S1303, the communication control unit 111 sends out the DCS signal in step S1304. In step S1305, the communication control unit 111 sends out a training signal to check the state of the line.

In step S1306, it is checked whether the CFR signal is received from the distant apparatus. If the CFR signal is not received or an FTT (Failure To Train) signal is received, the flow returns to step S1304 to send out the DCS signal upon changing the communication speed.

If it is determined in step S1306 that the CFR signal is received, the communication control unit 111 notifies the distant apparatus of a reason for communication interruption in step S1307. More specifically, as shown in FIG. 7, an image describing the reason for the interruption is transmitted. This interruption reason notification image may be coded and stored in the ROM 102 in advance. Alternatively, this interruption reason notification image may be generated when the reason for the interruption is to be notified.

When the transmission of the interruption reason notification image is completed, the communication control unit 111 sends out the PPS-EOP signal in step S1308. When the MCF signal is received in step S1309, the facsimile transmission procedure is terminated. Therefore, the communication control unit ill sends out the DCN signal in step S1310, and terminates the error reason notification processing.

As described above, according to the third embodiment, when the first block of a JPEG file is received, the JPEG header is analyzed. If the main scanning size declared in the communication protocol differs from the main scanning size declared in the JPEG file, communication is interrupted, and the distant apparatus is notified of the occurrence of an error and its contents. This prevents the transmitting side from erroneously recognizing that transmission is normally terminated in spite of the fact that a printout failure has occurred on the receiving side. In addition, this makes it possible to notify the transmitting side of information indicating the main scanning size of the JPEG file is wrong as the contents of the error.

<Modification of Third Embodiment>

Figure 8:
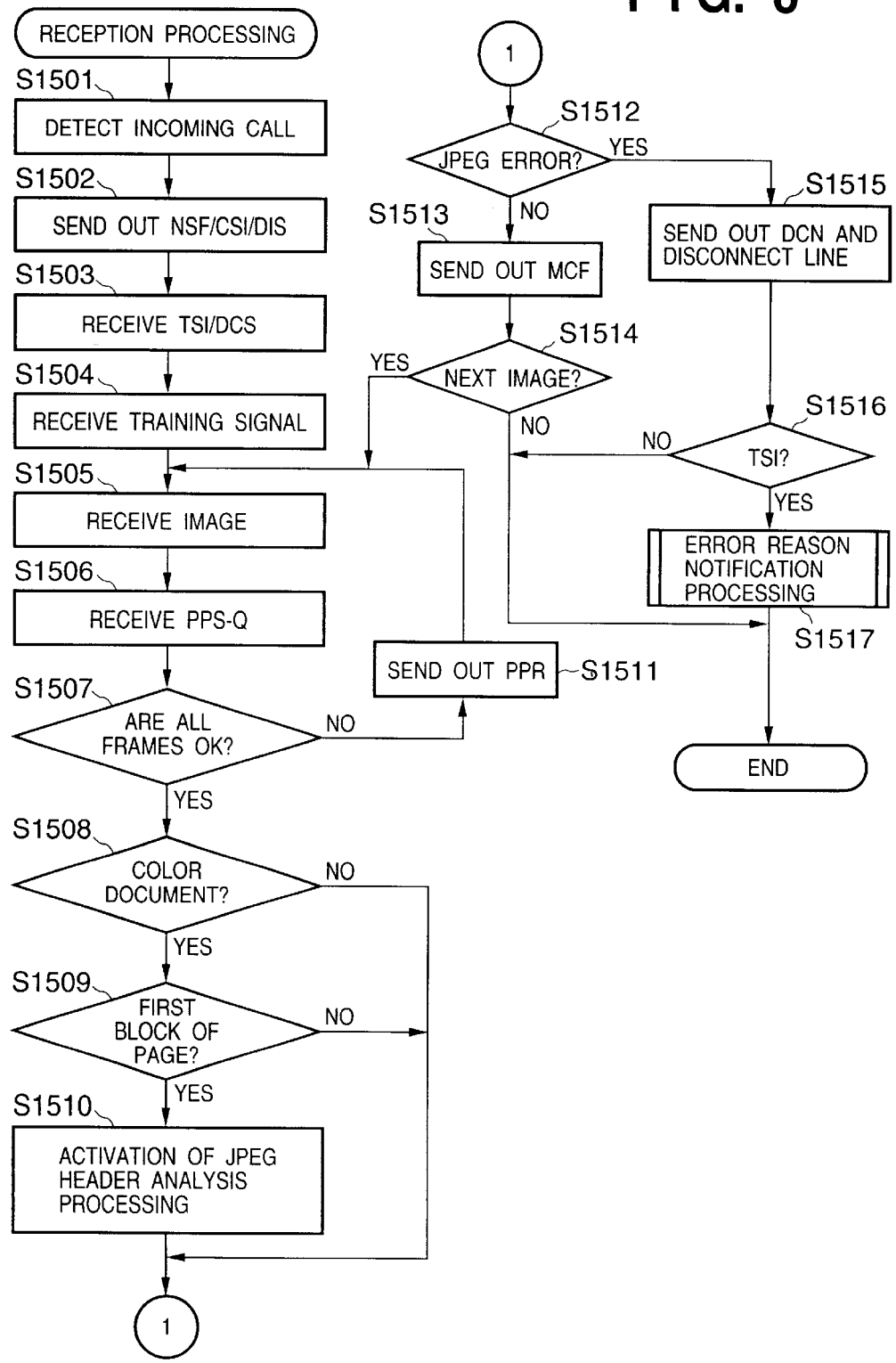
FIG. 8 is a flow chart showing reception processing in a modification of the third embodiment.

FIG. 8 is a flow chart showing a modification of the reception processing in the third embodiment. In this modification as well, when the communication main scanning size differs from a file main scanning size, communication is interrupted, and the distant apparatus notified of the corresponding information. A characteristic feature of this embodiment is that analysis processing of a JPEG header is performed independently of communication processing.

Referring to FIG. 8, the processing in steps S1501 to S1509 is the same as that in steps S1201 to S1209 in FIG. 5, and hence a description thereof will be omitted.

If it is determined in step S1509 that the image received in step S1505 is the first block of a page, a JPEG error flag set in a RAM 103 is cleared, and JPEG header analysis processing to be executed as another process is activated. The flow then advances to step S1512. With this operation, the JPEG header analysis processing and subsequent JPEG file reception processing are concurrently executed.

In step S1512, it is checked whether an error has occurred in the JPEG header analysis processing. No error has occurred in the first block of the page because the JPEG header analysis processing has just been activated. The flow therefore advances to step S1513 to send out the MCF signal. In step S1514, it is checked, on the basis of the type of PPS-Q signal received in step S1506, whether an image block is consecutively transmitted. If YES in step S1514, the next image block is received in step S1505.

Subsequently, the processing from step S1506 to step S1509 is performed again. In this case, since it is determined in step S1509 that the received image block is not the first block of the page, the flow advances to step S1512 to check on the basis of the JPEG error flag whether an error has occurred in the JPEG header analysis processing (step S1510) that has already been activated. If YES in step S1512, the flow advances to step S1515 to send out the DCN signal to the distant apparatus, thus performing error termination of communication.

In step S1516, it is checked whether the TSI signal has been received, together with the DCS signal. If YES in step S1516, error reason notification processing is performed with respect to the distant apparatus in step S1517, thereby terminating the reception processing. If the TSI signal has not been received, the reception processing is immediately terminated.

Figure 9:
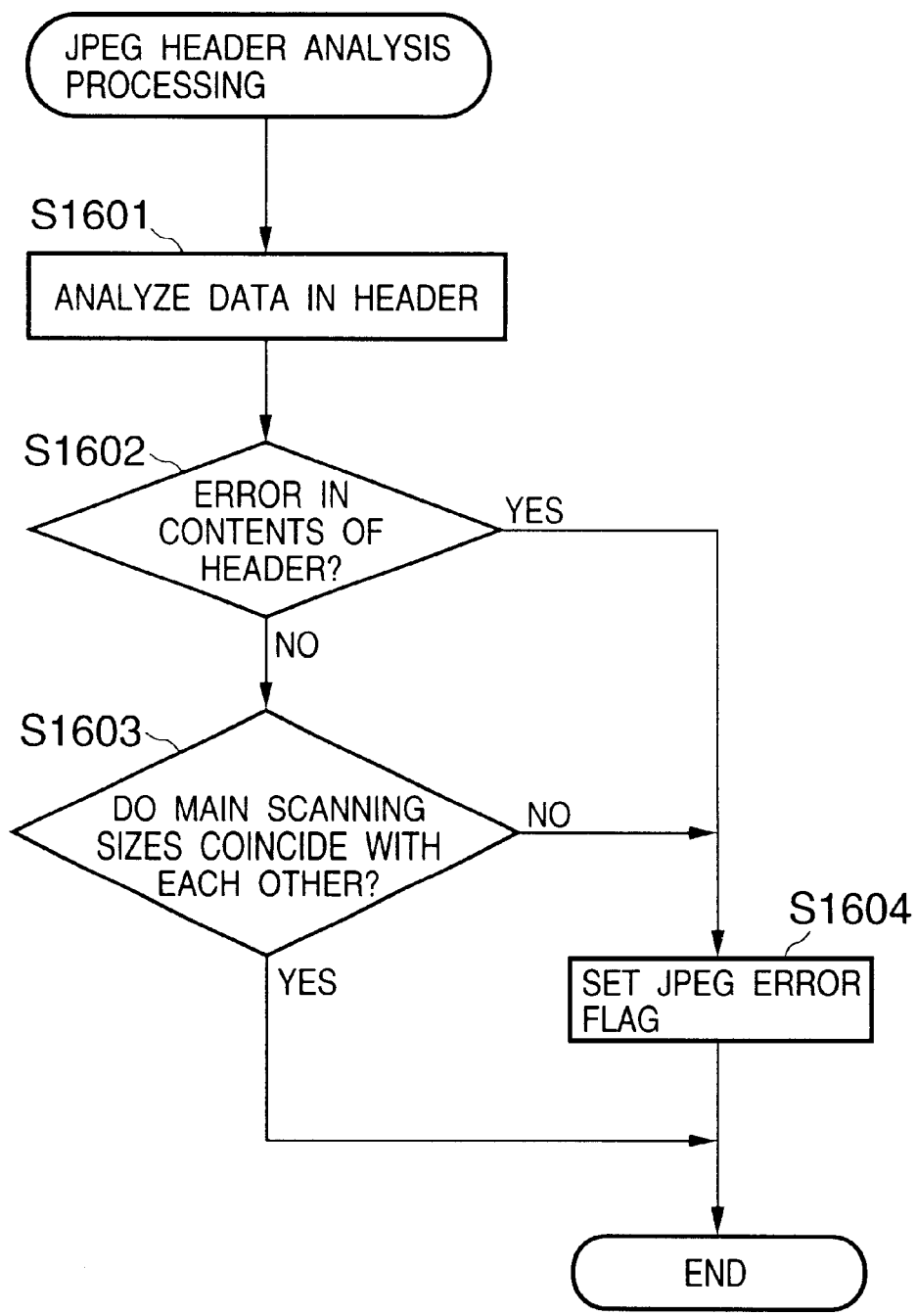
FIG. 9 is a flow chart showing JPEG header analysis processing in the modification of the third embodiment.

FIG. 9 is a flow chart showing JPEG header analysis processing to be activated in step S1510.

In step S1601, the data written in a JPEG header is read and analyzed. In step S1602, it is checked whether an error has occurred in the contents of the header. If YES in step S1602, the flow advances to step S1604 to turn on the JPEG error flag set in the RAM 103.

If it is determined in step S1602 that there is no error in the contents of the header, the flow advances to step S1603 to check whether the main scanning pixel size defined in the JPEG header coincides with the main scanning pixel size calculated from the resolution and main scanning width declared in the DCS signal. If NO in step S1603, the flow advances to step S1604 to turn on the JPEG error flag. When the JPEG error flag is turned on in this manner, the reception processing routine shown in FIG. 8 can detect the occurrence of a JPEG error.

As described above, according to the modification of the third embodiment, concurrent execution of JPEG file reception processing and JPEG header analysis processing as independent processes prevents the JPEG header analysis processing from affecting communication control even in a system with low processing speed, thereby increasing the overall processing speed.

In the third embodiment, in error reason notification processing, the apparatus originates a call to the telephone number notified by the distant apparatus over the TSI signal. Obviously, however, even if the apparatus originates a call to the telephone number notified by calling number identification presentation, the same effects as described above can be obtained.

Note that the respective embodiments described above may be combined. If, for example, the communication main scanning size differs from a file main scanning size, communication is temporarily interrupted, and the distant apparatus is notified of the corresponding information as in the third embodiment. If the apparatus receives a notification that the JPEG file is not transmitted again or a forcible print instruction, the communication is resumed, and an image can be printed without any omission upon selection of an appropriate printing medium as in the second embodiment.

[Other Embodiments]

Note that the present invention may be applied to either a system constituted by a plurality of devices (e.g., a host computer, an interface device, a reader, a printer, and the like), or an apparatus consisting of a single device (e.g., a copying machine, a facsimile apparatus, or the like).

The objects of the present invention are also achieved by supplying a storage medium (or recording medium), which records a program code of a software program that can realize the functions of the above-mentioned embodiments to the system or apparatus, and reading out and executing the program code stored in the storage medium by a computer (or a CPU or MPU) of the system or apparatus. In this case, the program code itself read out from the storage medium realizes the functions of the above-mentioned embodiments, and the storage medium which stores the program code constitutes the present invention. The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An image communication apparatus for communicating image data with a second apparatus on the basis of a communication protocol including declaration of a main scanning size, comprising:

reception means for receiving from the second apparatus a compressed image file including information indicating that a main scanning size is a first size;

main scanning size control means for setting the first size as a main scanning size when a second size differs from the first size, wherein the second size is declared as a main scanning size in the communication protocol of communication with the second apparatus in association with the compressed image file; and image processing means for processing the compressed image file on the basis of the set main scanning size.

2. The apparatus according to claim 1, wherein said image processing means includes:

decompression means for decompressing the compressed image file; and output means for outputting the decompressed image data.

3. The apparatus according to claim 2, wherein said apparatus further comprises output position setting means for setting an image output position when the first size differs from the second size, and wherein said output means outputs the image data decompressed on the basis of the set image output position.

4. The apparatus according to claim 3, wherein the output position setting means can set the image output position as centered in a main scanning direction.

5. The apparatus according to claim 3, wherein said output position setting means can set the image output position as left-aligned in a main scanning direction.

6. The apparatus according to claim 2, wherein said output means prints out image data on a printing medium.

7. An image communication apparatus for communicating image data with a second apparatus on the basis of a communication protocol including declaration of a main scanning size, comprising:

reception means for receiving from the second apparatus a compressed image file including information indicating that a main scanning size is a first size;

main scanning size control means for setting the first size as a main scanning size when a second size differs from the first size, wherein the second size is declared as a main scanning size in the communication protocol of communication with the second apparatus in association with the compressed image file;

selection means for selecting a printing medium on which printing can be performed in the set main scanning size;

decompression means for decompressing the compressed image file on the basis of the set main scanning size; and output means for outputting the decompressed image data on the selected printing medium.

8. The apparatus according to claim 7, wherein said selection means selects a printing medium having a main scanning size larger than the second size when the second size is smaller than the first size.

9. The apparatus according to claim 8, wherein said selection means selects a printing medium having a main scanning size equal to the second size when no printing medium having a main scanning size larger than the second size is available.

10. The apparatus according to claim 9, wherein when said selection means selects a printing medium having a main scanning size equal to the second size, said output means reduces the image data and prints out the reduced data on the printing medium.

11. An image communication apparatus for communicating image data with a second apparatus on the basis of a communication protocol including declaration of a main scanning size, comprising:

reception means for receiving from the second apparatus a compressed image file including information indicating that a main scanning size is a first size; and communication control means for stopping communication with the second apparatus when a second size declared as a main scanning size in the communication protocol of the communication with the second apparatus in association with the compressed image file.

12. The apparatus according to claim 11, wherein said communication control means compares the second size with the first size when said reception means receives part of the compressed image file normally.

13. The apparatus according to claim 11, further comprising notification means for notifying the second apparatus of an end message when said communication control means stops communication.

14. The apparatus according to claim 13, wherein the end message indicates a reason for communication stopping.

15. The apparatus according to claim 14, wherein the end message indicates that a main scanning width of the compressed image file is not normal.

16. The apparatus according to claim 13, further comprising holding means for holding the end message,
wherein said notification means notifies the second apparatus of the end message held by said holding means.

17. The apparatus according to claim 13, wherein said notification means transmits the end message to the second apparatus on the basis of a TSI signal received from the second apparatus.

18. The apparatus according to claim 13, wherein said notification means transmits the end message to the second apparatus on the basis of calling number identification presentation from the second apparatus.

19. The apparatus according to claim 1, wherein the communication protocol complies with the ITU-T T.30 recommendation.

20. The apparatus according to claim 1, wherein the compressed image file is a JPEG file.

21. The apparatus according to claim 1, wherein said image communication apparatus is a facsimile apparatus.

22. The apparatus according to claim 7, wherein the communication protocol complies with the ITU-T T.30 recommendation.

23. The apparatus according to claim 7, wherein the compressed image file is a JPEG file.

24. The apparatus according to claim 7, wherein said image communication apparatus is a facsimile apparatus.

25. The apparatus according to claim 11, wherein the communication protocol complies with the ITU-T T.30 recommendation.

26. The apparatus according to claim 11, wherein the compressed image file is a JPEG file.

27. The apparatus according to claim 11, wherein said image communication apparatus is a facsimile apparatus.

28. A control method for an image communication apparatus for communicating image data with a second apparatus on the basis of a communication protocol including declaration of a main scanning size, comprising:
a reception step, of receiving from the second apparatus a compressed image file including information indicating that a main scanning size is a first size;
a determination step, of determining whether a second size coincides with the first size, wherein the second size is declared as a main scanning size in the communication protocol of communication with the second apparatus in association with the compressed image file;
a setting step, of setting the first size as a main scanning size when the determination result indicates inconsistency; and
an image processing step, of processing the compressed image file on the basis of the set main scanning size.

29. A control method for an image communication apparatus for communicating image data with a second apparatus on the basis of a communication protocol including declaration of a main scanning size, comprising:
a reception step, of receiving from the second apparatus a compressed image file including information indicating that a main scanning size is a first size;
a main scanning size control step, of setting the first size as a main scanning size when a second size differs from the first size, wherein the second size is declared as a main scanning size in the communication protocol of communication with the second apparatus in association with the compressed image file;
a selection step, of selecting a printing medium on which printing can be performed in the set main scanning size;
a decompression step, of decompressing the compressed image file on the basis of the set main scanning size; and
an output step, of outputting the decompressed image data onto the selected printing medium.

30. A control method for an image communication apparatus for communicating image data with a second apparatus on the basis of a communication protocol including declaration of a main scanning size, comprising:
a reception step, of receiving from the second apparatus a compressed image file including information indicating that a main scanning size is a first size; and
a communication control step, of interrupting stopping communication with the second apparatus when a second size differs from the first size, wherein the second size is declared as a main scanning size in the communication protocol of communication with the second apparatus in association with the compressed image file.

31. The method according to claim 28, wherein the communication protocol complies with the ITU-T T.30 recommendation.

32. The method according to claim 28, wherein the compressed image file is a JPEG file.

33. The method according to claim 29, wherein the communication protocol complies with the ITU-T T.30 recommendation.

34. The method according to claim 29, wherein the compressed image file is a JPEG file.

35. The method according to claim 30, wherein the communication protocol complies with the ITU-T T.30 recommendation.

36. The method according to claim 30, wherein the compressed image file is a JPEG file.

37. A recording medium recording a control program in an image communication apparatus for communicating image data with another apparatus on the basis of a communication protocol including declaration of a main scanning size, wherein the program comprises at least:
a code for the reception step of receiving from said another apparatus a compressed image file including information indicating that a main scanning size is a first size;
a code for the determination step of determining whether a second size coincides with the first size, wherein the second size is declared as a main scanning size in the communication protocol of communication with said another apparatus in associated with said compressed image file;

a code for the setting step of setting the first size as a main scanning size when the determination result indicates inconsistency; and a code for the image processing step of processing the compressed image file on the basis of the set main scanning size.

38. A recording medium recording a control program in an image communication apparatus for communicating image data with another apparatus on the basis of a communication protocol including declaration of a main scanning size, wherein the program comprises at least:

a code for the reception step of receiving from said another apparatus a compressed image file including information indicating that a main scanning size is a first size;

a code for the main scanning size control step of setting the first size as a main scanning size when a second size differs from the first size, wherein the second size is declared as a main scanning size in the communication protocol of communication with said another apparatus in associated with said compressed file;

a code for the selection step of selecting a printing medium on which printing can be performed in the set main scanning size;

a code for the decompression step of decompressing the compressed image file on the basis of the set main scanning size; and a code for the output step of outputting the decompressed image data onto the selected printing medium.

39. A recording medium recording a control program in an image communication apparatus for communicating image data with another apparatus on the basis of a communication protocol including declaration of a main scanning size, wherein the program comprises at least:

a code for the reception step of receiving from said another apparatus a compressed image file including information indicating that a main scanning size is a first size; and a code for the communication control step of stopping communication with said another apparatus when a second size differs from the first size, wherein the second size is declared as a main scanning size in the communication protocol of communication with said another apparatus in associated with said compressed image file.

40. An image communication apparatus for communicating image data with a second apparatus on the basis of a communication protocol including declaration of a size, comprising:

reception means for receiving from the second apparatus a compressed image file including information indicating that a size is a first size;

size control means for setting the first size as a set size when a second size differs from the first size, wherein the second size is declared as the set size in the communication protocol of a communication with the second apparatus in association with the compressed image file; and image processing means for processing the compressed image file on the basis of the set size.

41. An image communication apparatus for communicating image data with a second apparatus on the basis of a communication protocol including declaration of a size, comprising:

reception step, of receiving from the second apparatus a compressed image file including information indicating that a size is a first size;

size control means for setting the first size as a set size when a second size differs from the first size, wherein the second size is declared as the set size in the communication protocol of a communication with the second apparatus in association with the compressed image file;

selection means for selecting a printing medium on which printing can be performed in the set size;

decompression means for decompressing the compressed image file on the basis of the set size; and output means for outputting the decompressed image data onto the selected printing medium.

42. An image communication apparatus for communicating image data with a second apparatus on the basis of a communication protocol including declaration of a size, comprising:

reception means for receiving from the second apparatus a commpressed image file including information indicating that a size is first size; and communication control means for stopping communication with the second apparatus when a second size differs from the first size, wherein the second size is declared as a size in the communication protocol of a communication with the second apparatus in association with the compressed image file.

43. A control method for an image communication apparatus for communicating image data with a second apparatus on the basis of a communication protocol including declaration of a size, comprising:

a reception step, of receiving from the second apparatus a compressed image file including information indicating that a size is a first size;

a determination step, of determining whether the second size coincides with the first size, wherein the second size is declared as a size in the communication protocol of a communication with the second apparatus in association with the compressed image file;

a setting step, of setting the first size as a set size when a determination result indicates inconsistency; and an image processing step, of processing the compressed image file on the basis of the set size.

44. A control method for an image communication apparatus for communicating image data with a second apparatus on the basis of a communication protocol including declaration of a size, comprising:

a reception step, of receiving from the second apparatus a compressed image file including information indicating that a size is a first size;

a size control step, of setting the first size as a set size when a second size differs from the first size, wherein the second size is declared as the set size in the communication protocol of a communication with the second apparatus in association with the compressed image file;

a selection step, of selecting a printing medium on which printing can be performed in the set size;

a decompression size, of decompressing the compressed image file on the basis of the set size; and an output step, of outputting the decompressed image data onto the selected printing medium.

45. A control method for an image communication apparatus for communicating image data with a second apparatus on the basis of a communication protocol including declaration of a size, comprising:

a reception step, of receiving from the second apparatus a compressed image file including information indicating that a size is a first size; and a communication control step, of stopping communication with the second apparatus when a second size differs from the first size, wherein the second size is declared as a size in the communication protocol of a communication with the second apparatus in association with the compressed image file.

46. A recording medium recording a control program in an image communication apparatus for communicating image data with a second apparatus on the basis of a communication protocol including declaration of a size, wherein the program comprises at least:

a code for a reception step of receiving from the second apparatus a compressed image file including information indicating that a size is a first size;

a code for a determination step of determining whether a second size coincides with the first size, wherein the second size is declared as a size in the communication protocol of a communication with the second apparatus is association with the compressed image file;

a code for a setting step of setting the first size as a set size when the determination result indicates inconsistency; and a code for an image processing step of processing the compressed image file on the basis of the set size.

47. A recording medium recording a control program in an image communication apparatus for communicating image data with a second apparatus on the basis of a communication protocol including declaration of a size, wherein the program comprises at least:

a code for a reception step of receiving from the second apparatus a compressed image file including information indicating that a size is a first size;

a code for a size control step of setting the first size as a set size when a second size differs from the first size, wherein the second size is declared as the set size in the communication protocol of communication with the second apparatus in association with the compressed image file;

a code for the selection step of selecting a printing medium onto which printing can be performed in the set size;

a code for a decompression step of decompressing the compressed image file on the basis of the set size; and a code for the output step of outputting the decompressed image data onto the selected printing medium.

48. A recording medium recording a control program in an image communication apparatus for communicating image data with a second apparatus on the basis of a communication protocol including declaration of a size, wherein the program comprises at least:

a code for a reception step of receiving from the second apparatus a compressed image file including information indicating that a size is a first size; and a code for a communication control step of stopping communication with the second apparatus when a second size is declared as a size in the communication protocol of a communication with the second apparatus in association with the compressed image file.

* * * * *

UNITED STATES PATENT AND TRADEMARK OFFICE
CERTIFICATE OF CORRECTION

PATENT NO. : 6,810,150 B1
APPLICATION NO. : 09/605374
DATED : October 26, 2004
INVENTOR(S) : Naoto Akimoto It is certified that error appears in the above-identified patent and that said Letters Patent is hereby corrected as shown below:

SHEET 4:
    Fig. 4, in box S2305, "SIZE" should read --SIZES--.

COLUMN 3:
    Line 57, "item"print- " should read --item "print- --.

COLUMN 4:
    Line 10, "image to" should read --image--.

COLUMN 9:
    Line 56, "unit ill" should read --unit 111--.

COLUMN 12:
    Line 2, "communication" should read --a communication--;
    Line 37, "communication" should read --a communication--;
    Line 45, "on" should read --onto--; and
    Line 56, "wherein" should read -- wherein,--.

COLUMN 13:
    Line 3, "declared" should read --differs from the first size, wherein the second size is declared--;
    Line 62, "communication" should read --a communication--;
    Line 66, "the determination" should read --a determination-- and "result" should read --result of said determination step--.

COLUMN 14:
    Line 14, "communication" should read --a communication--;
    Line 30, "interrupting" should be deleted;
    Line 34, "of communication" should read --of a communication--;
    Line 54, "another" should read --a second--;
    Line 58, "the reception" should read --a reception--;
    Line 59, "another" should read --the second--;
    Line 62, "the determination" should read --a determination--;
    Line 65, "communication" should read --a communication--; "associated" should read --association-- and "said" should read --the--; and
    Line 66, "another" should read --second--, "associated" should read --association-- and "said compressed" should read --the compressed--.

UNITED STATES PATENT AND TRADEMARK OFFICE
CERTIFICATE OF CORRECTION

PATENT NO. : 6,810,150 B1
APPLICATION NO. : 09/605374
DATED : October 26, 2004
INVENTOR(S) : Naoto Akimoto It is certified that error appears in the above-identified patent and that said Letters Patent is hereby corrected as shown below:

COLUMN 15:
    Line 1, "the setting" should read --a setting--;
    Line 2, "the determination" should read --a determination-- and
        "result" should read --result of the determination step--;
    Line 4, "the image" should read --an image--;
    Line 8, "another" should read --a second--;
    Line 11, "the reception" should read --a reception--; and
        "said" should read --the--;
    Line 12, "another" should read --the second--;
    Line 15, "the main" should read --a main--;
    Line 19, "communication" should read --a communication-- and
        "said another" should read --the second--;
    Line 20, "associated" should read --association-- and
        "said compressed" should read --the compressed--;
    Line 21, "the selection" should read --a selection--;
    Line 24, "the decompression" should read --a decompression--;
    Line 27, "the output" should read --an output--;
    Line 31, "another" should read --a second--;
    Line 34, "the reception" should read --a reception-- and
        "said" should read --the--;
    Line 35, "another" should read --second--;
    Line 38, "the communication" should read --a communication--;
    Line 39, "communication" should read --the communication-- and
        "said another" should read --the second--;
    Line 42, "said" should read --the--; and
    Line 43, "another" should read --second-- and
        "associated" should read --association-- and
        "said" should read --the--.

UNITED STATES PATENT AND TRADEMARK OFFICE
CERTIFICATE OF CORRECTION

PATENT NO. : 6,810,150 B1
APPLICATION NO. : 09/605374
DATED : October 26, 2004
INVENTOR(S) : Naoto Akimoto It is certified that error appears in the above-identified patent and that said Letters Patent is hereby corrected as shown below:

COLUMN 16:
    Line 17, "commpressed" should read --compressed--.

COLUMN 17:
    Line 19, "is association" should read --in association--.

Signed and Sealed this

Eighth Day of August, 2006

JON W. DUDAS
*Director of the United States Patent and Trademark Office*